April 1, 1930.  A. L. KRONQUEST  1,752,912
CAN CLOSING MACHINE
Filed Dec. 15, 1926   13 Sheets-Sheet 7
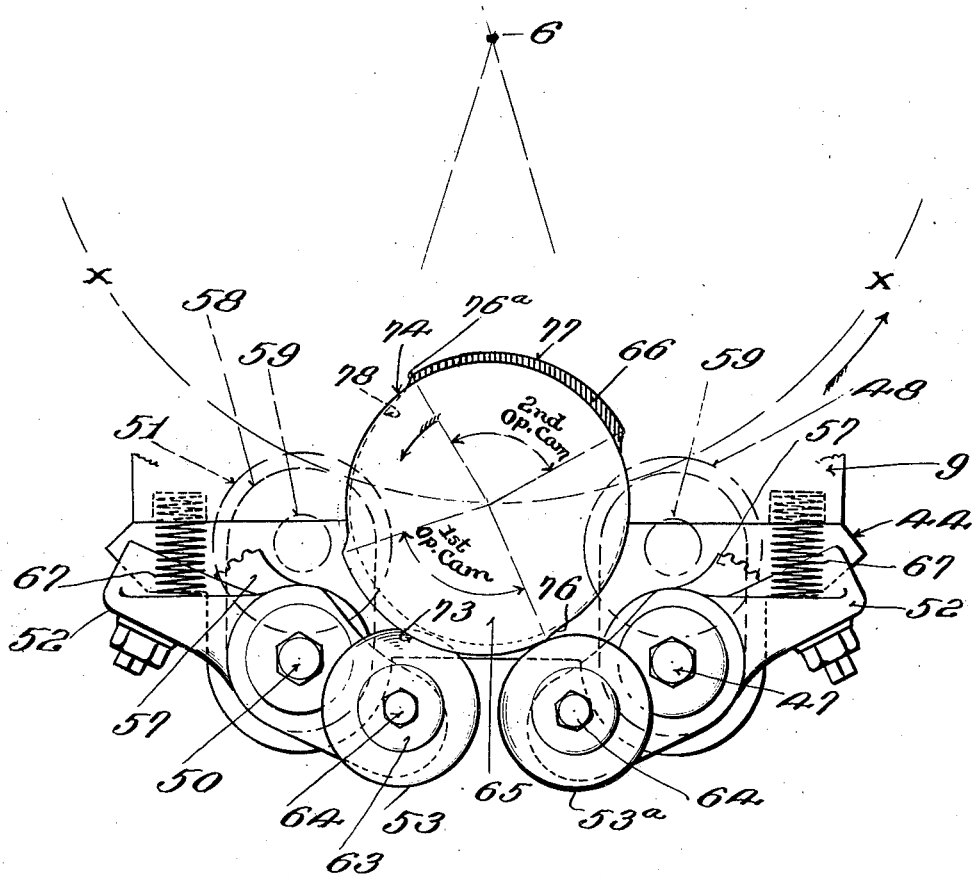
FIG. 5ª
Inventor
Alfred L. Kronquest
By Sturtevant & Mason
Attorneys.

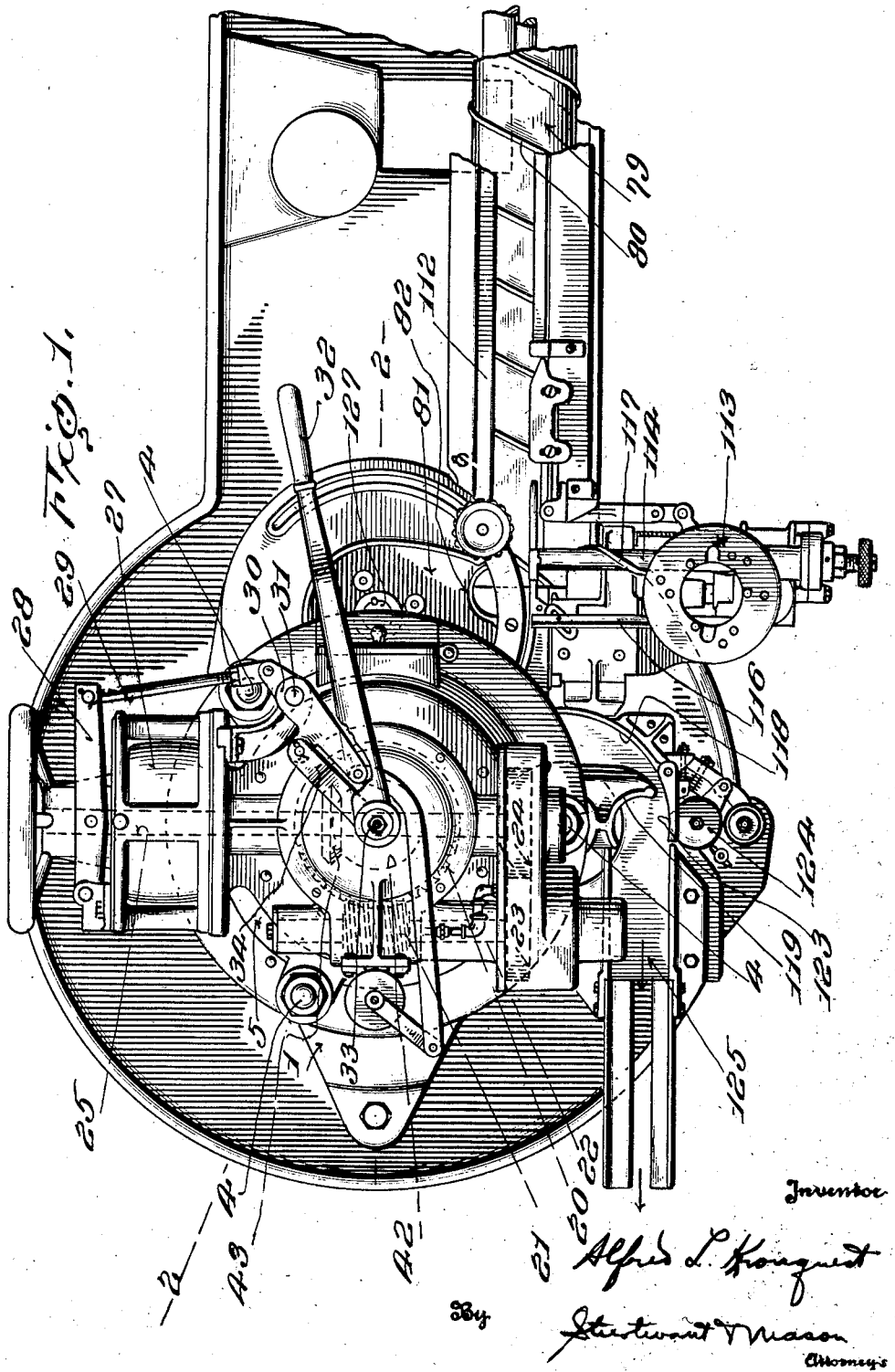

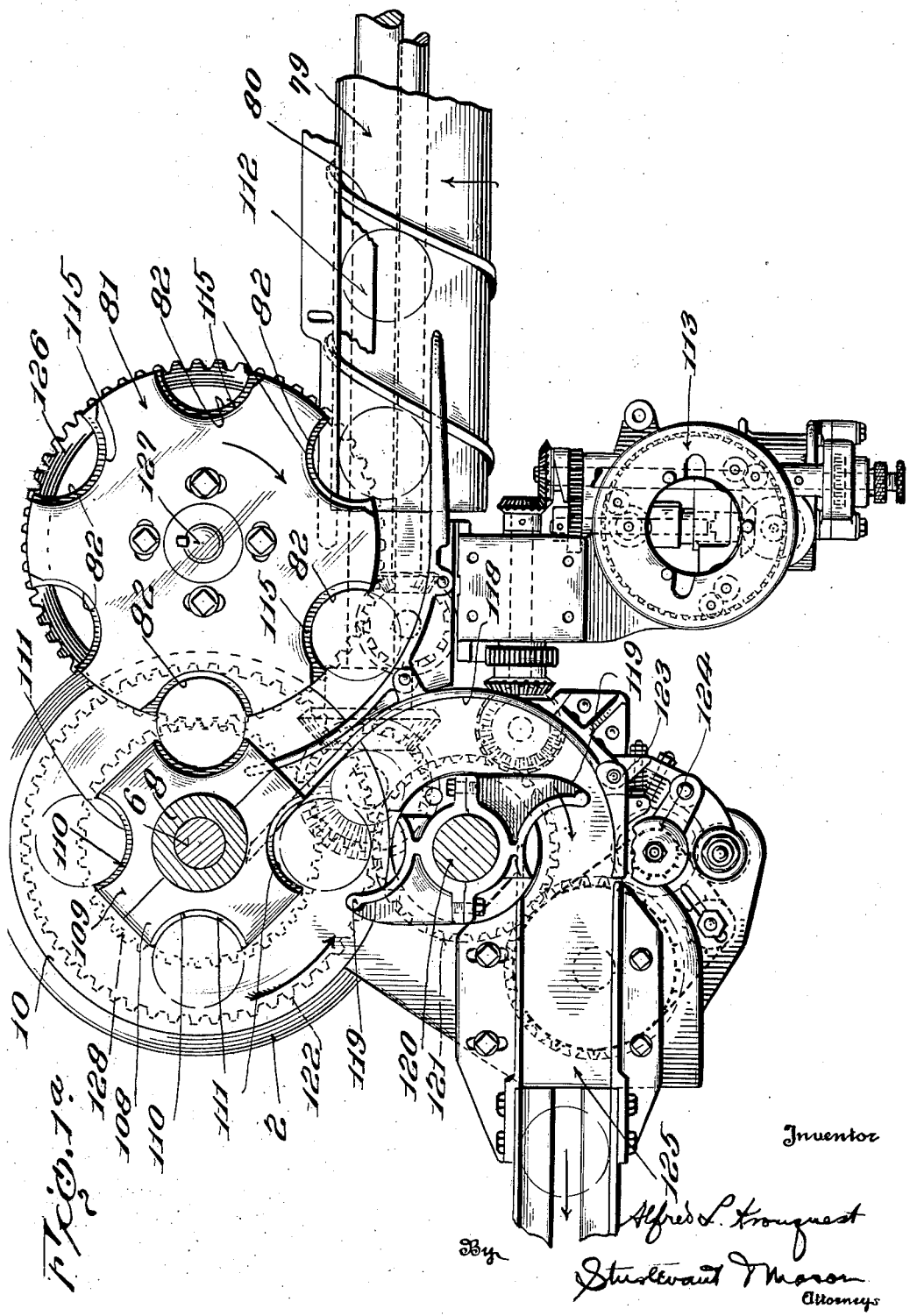

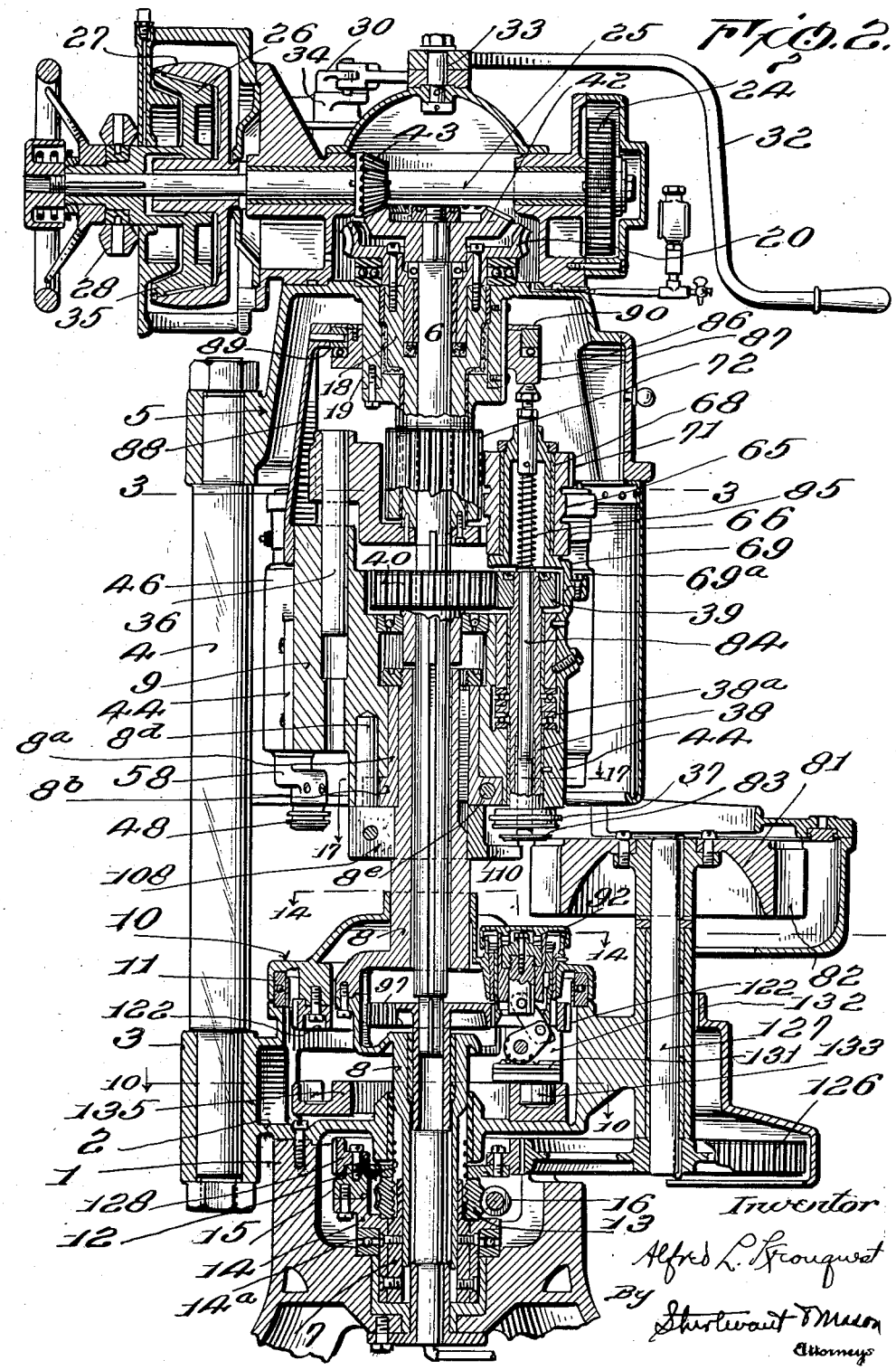

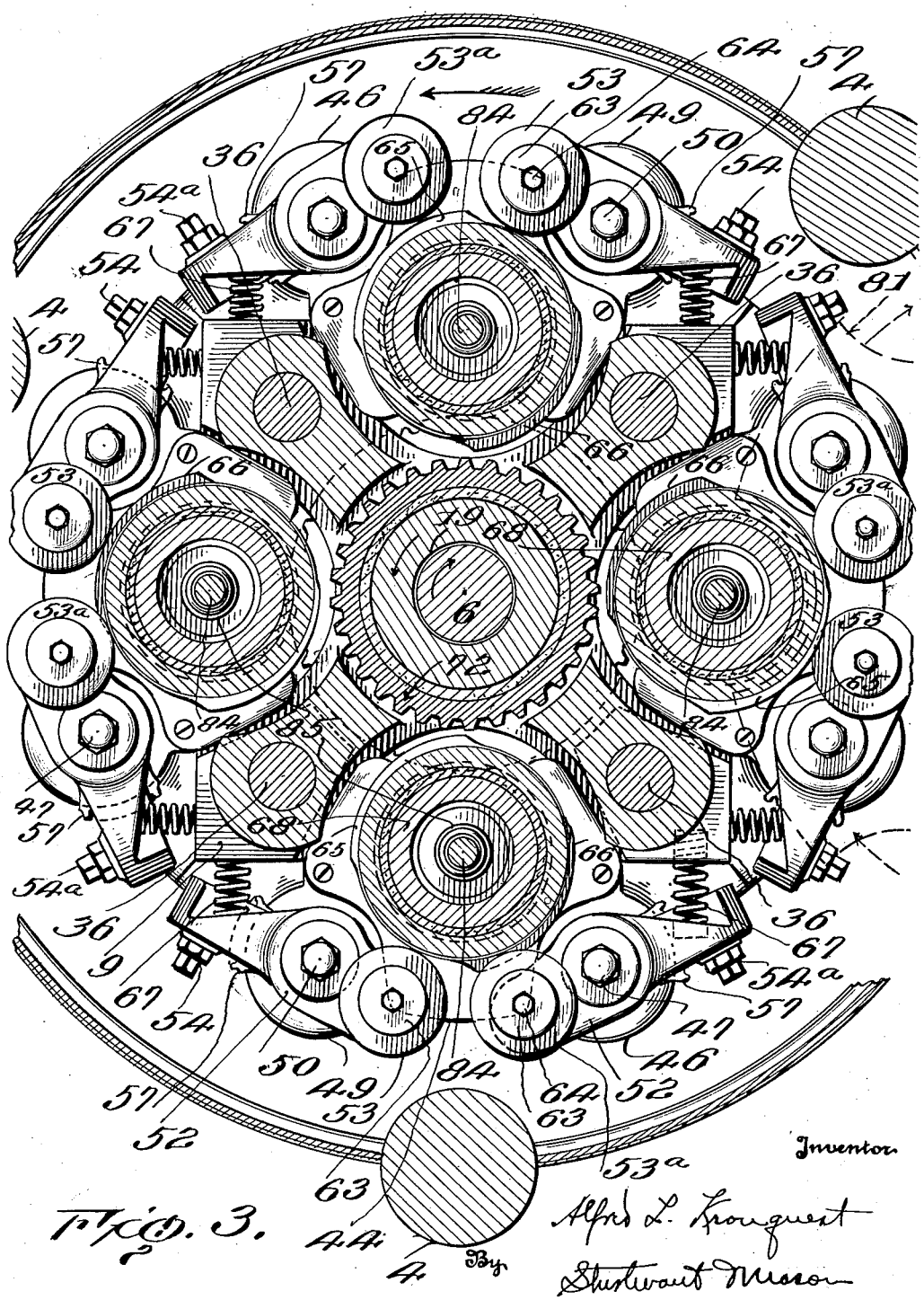

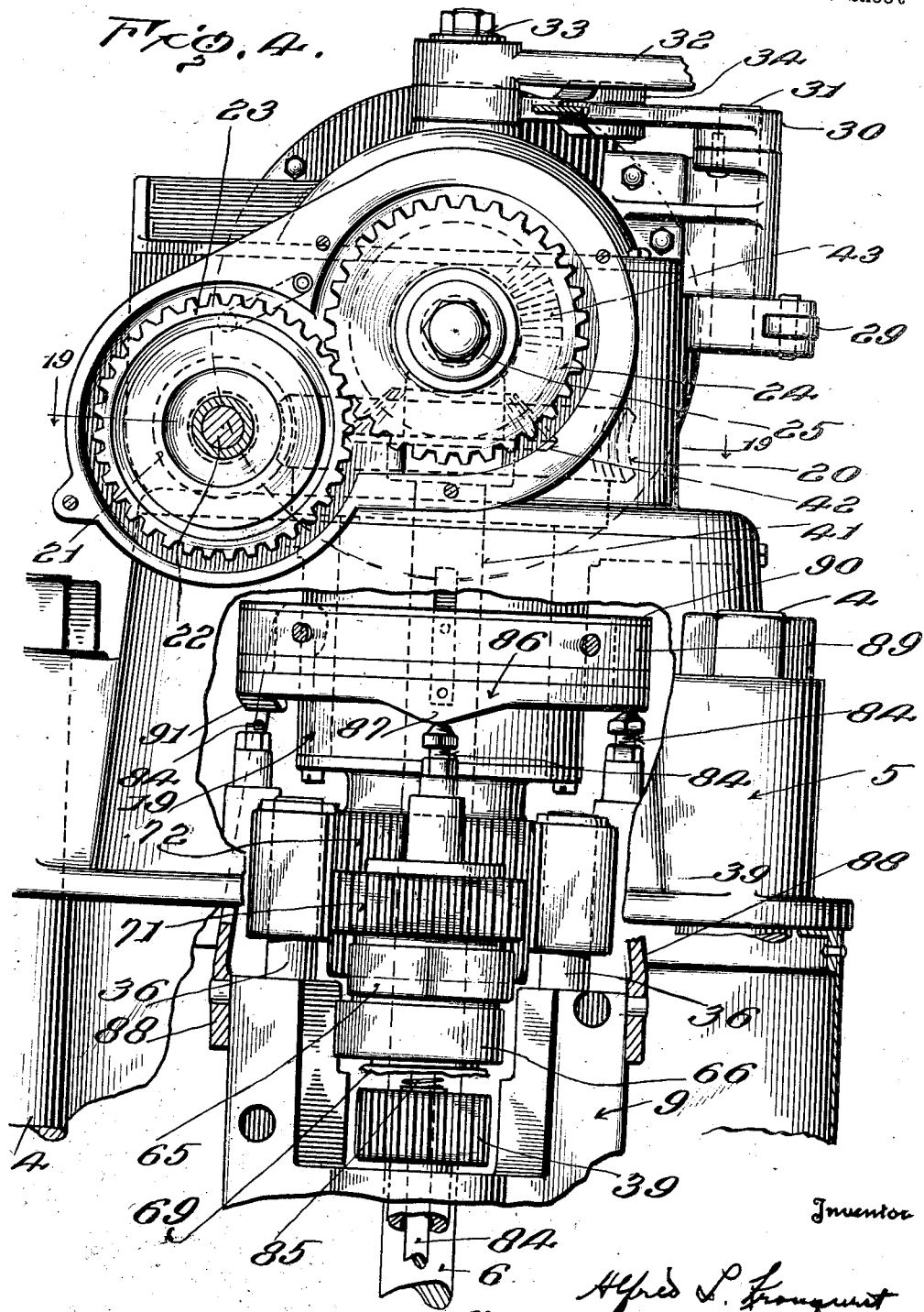

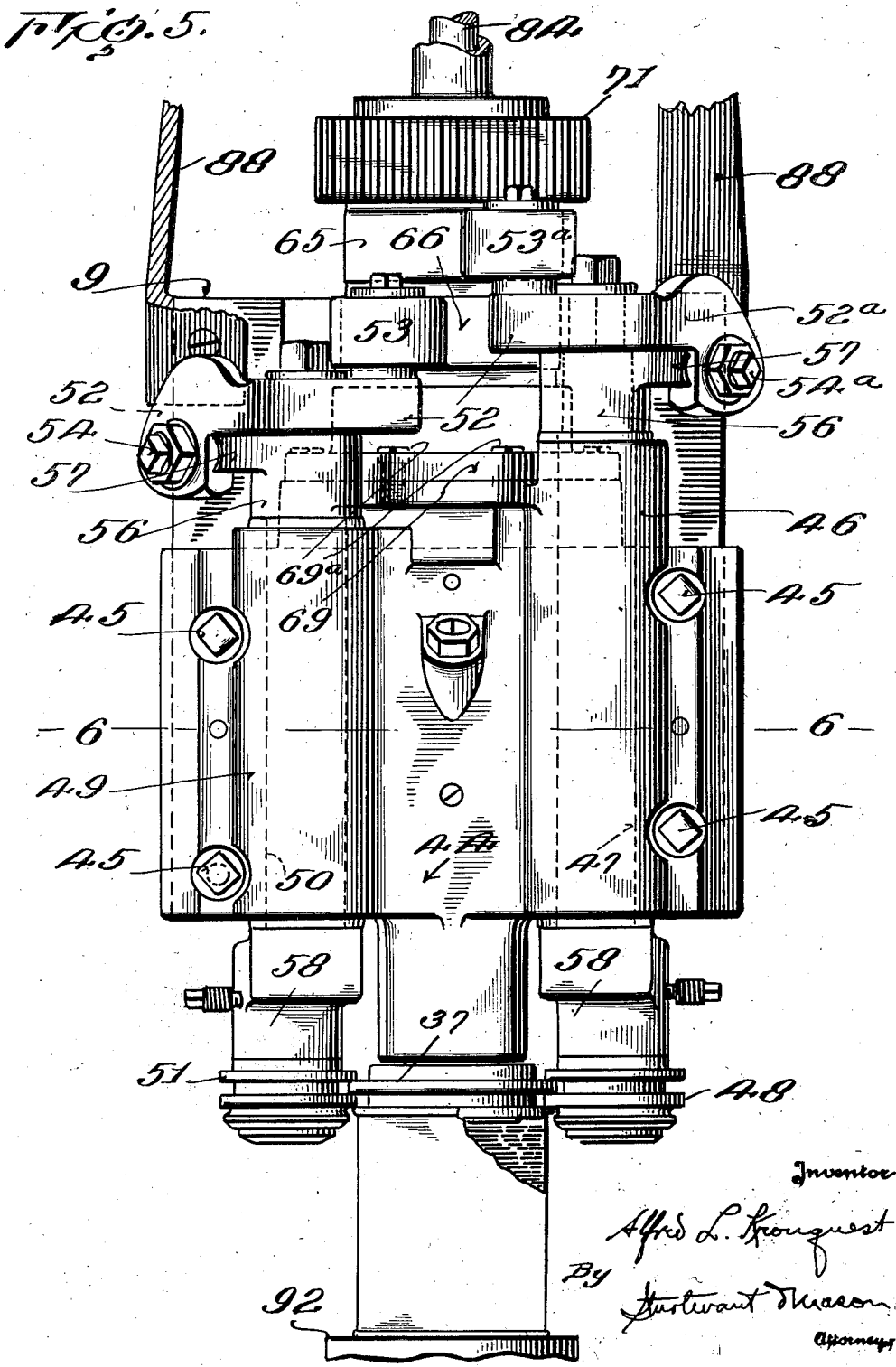

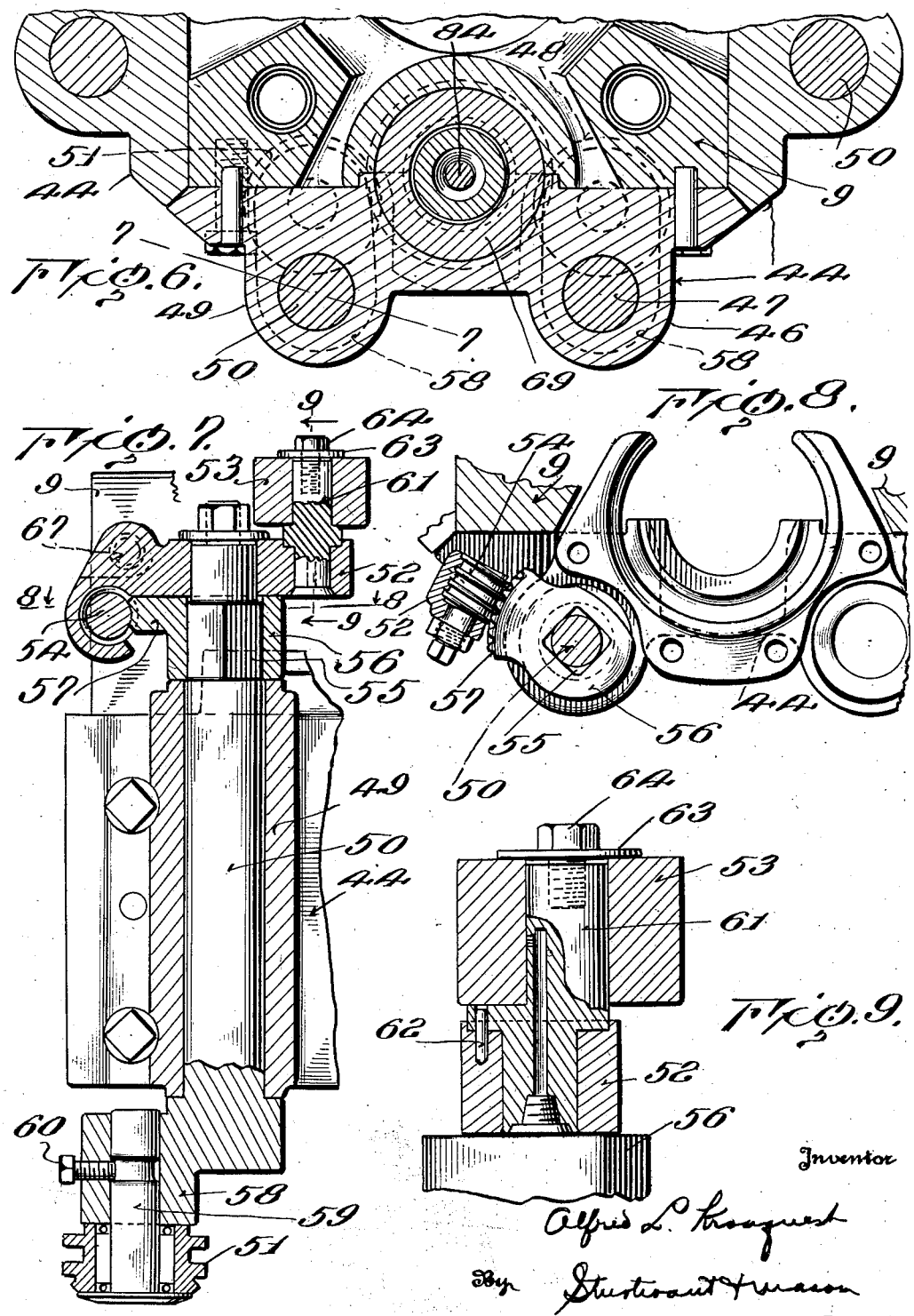

April 1, 1930.  A. L. KRONQUEST  1,752,912
CAN CLOSING MACHINE
Filed Dec. 15, 1926    13 Sheets-Sheet 9
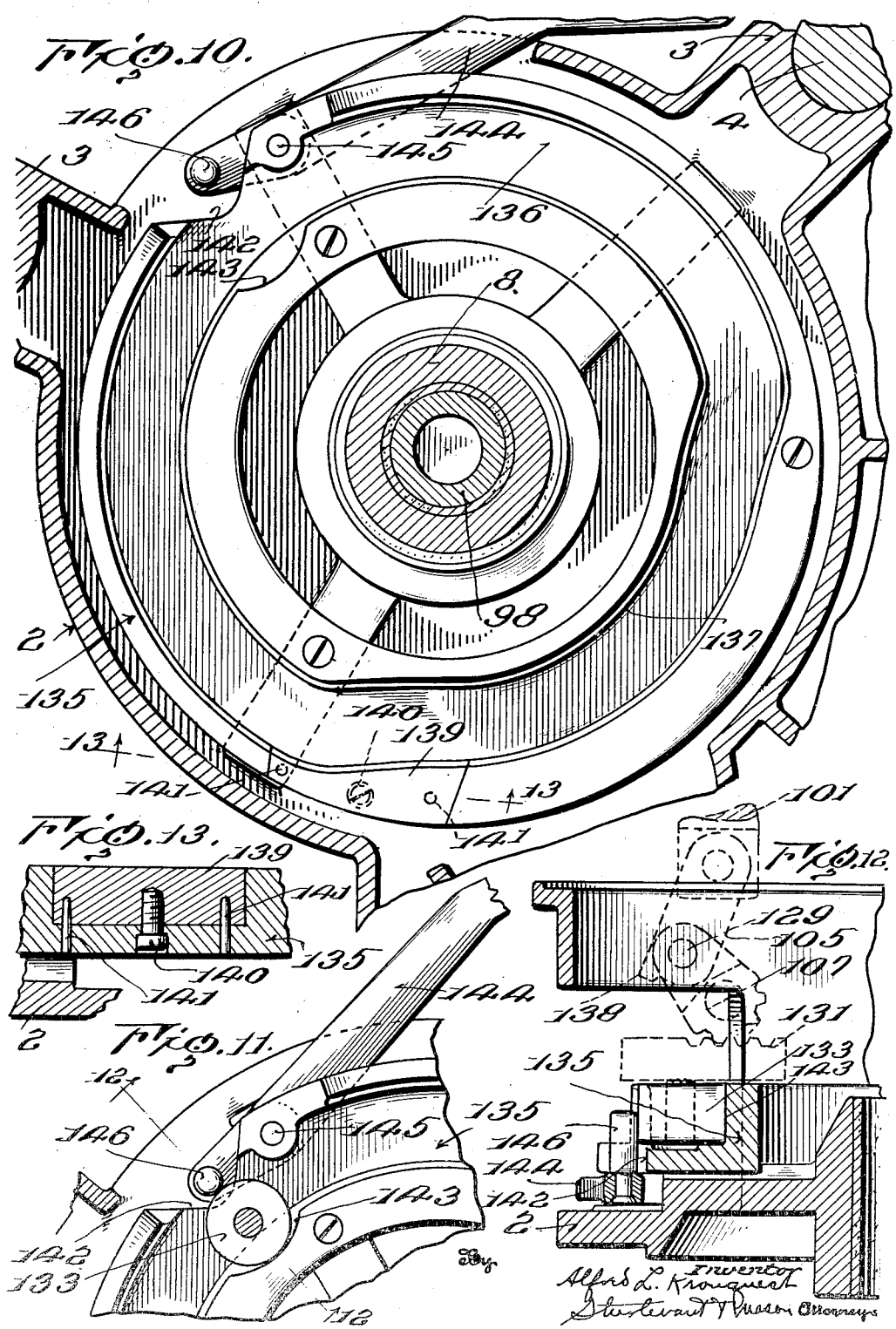

April 1, 1930.  A. L. KRONQUEST  1,752,912
CAN CLOSING MACHINE
Filed Dec. 15, 1926     13 Sheets-Sheet 10
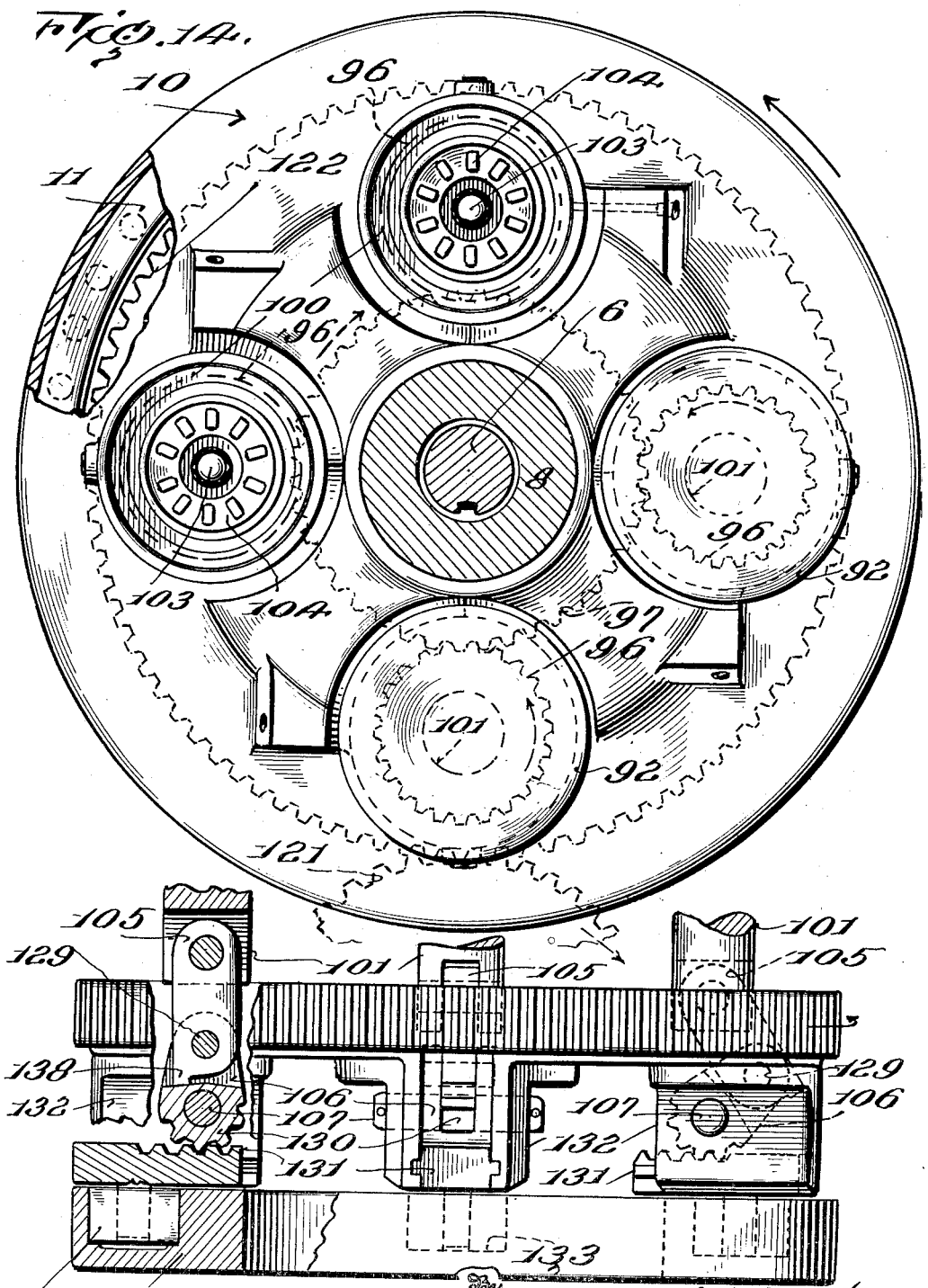

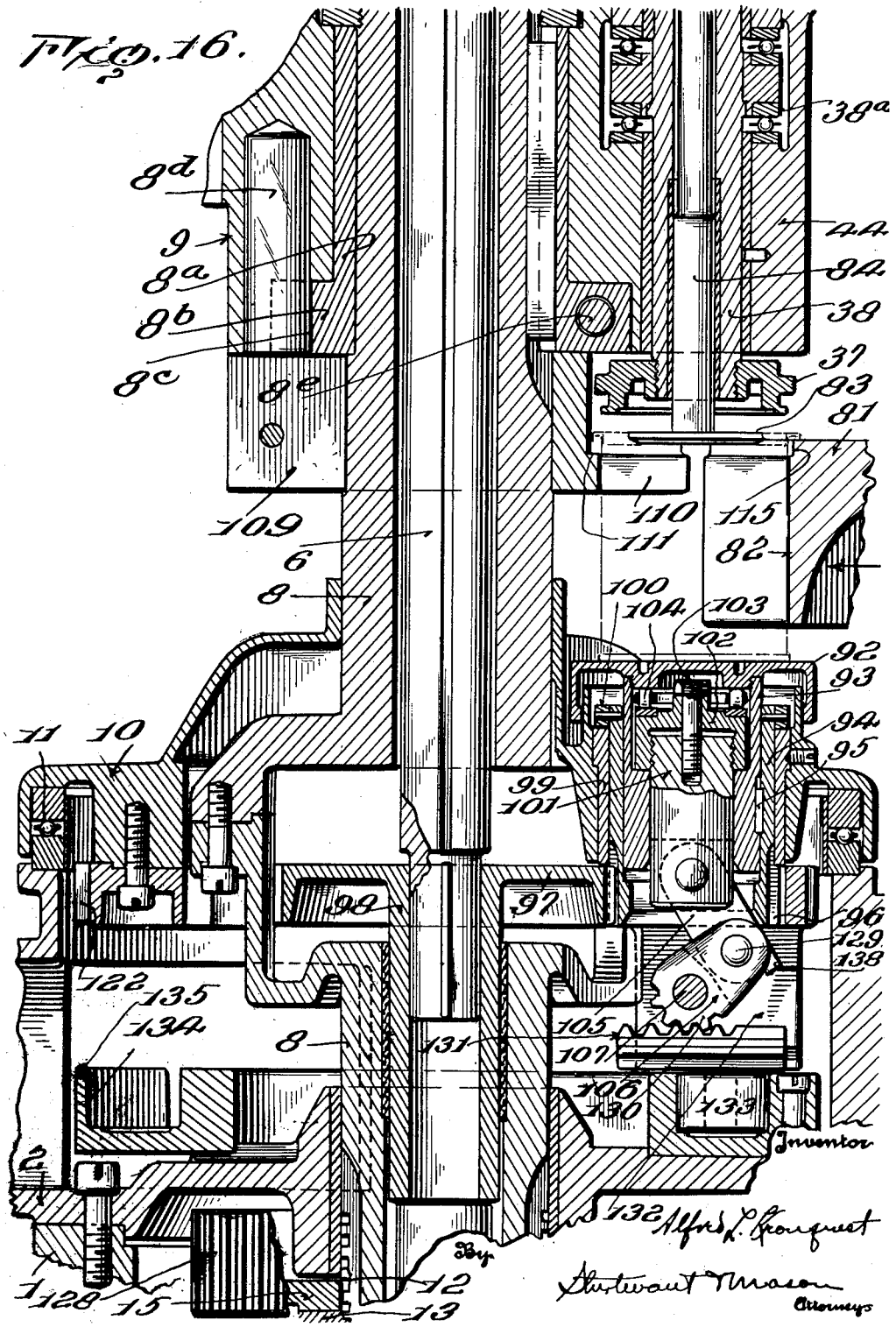

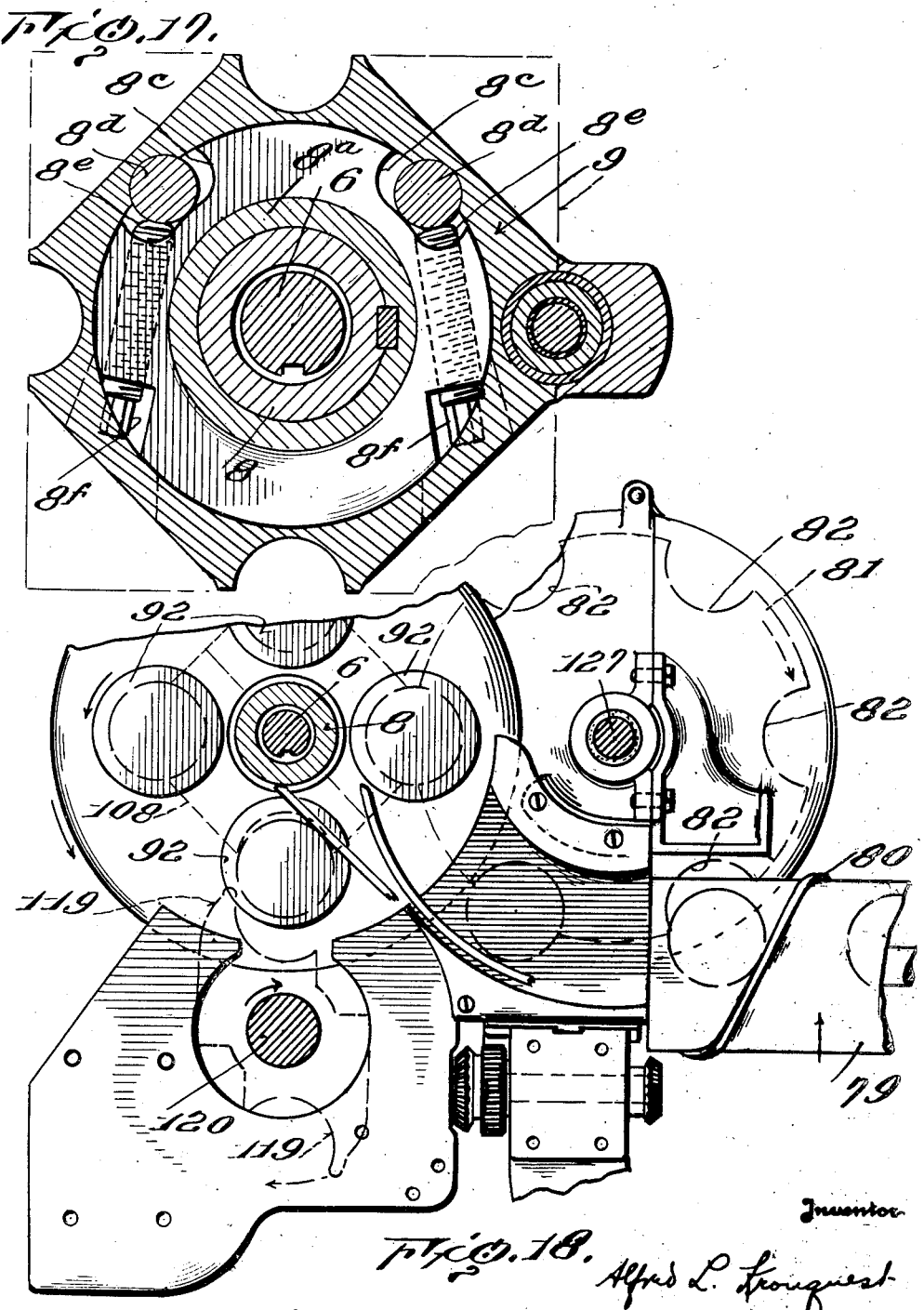

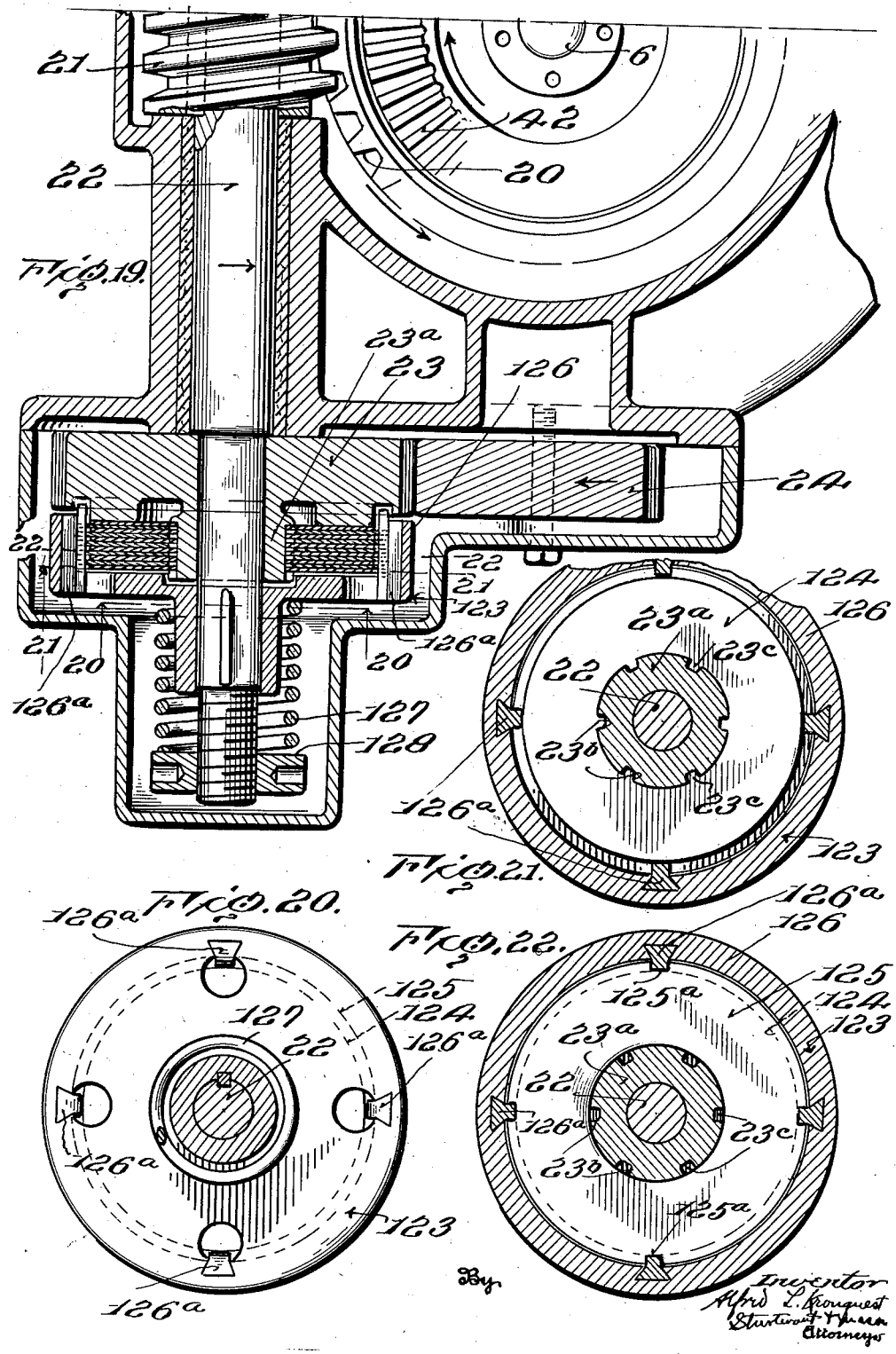

Patented Apr. 1, 1930

1,752,912

UNITED STATES PATENT OFFICE

ALFRED L. KRONQUEST, OF CHICAGO, ILLINOIS, ASSIGNOR TO CONTINENTAL CAN COMPANY, INC., OF NEW YORK, N. Y., A CORPORATION OF NEW YORK

CAN-CLOSING MACHINE

Application filed December 15, 1926. Serial No. 155,017.

The invention relates to new and useful improvements in can closing machines, and more particularly to a can closing machine having a plurality of closing stations which are moving continuously and which receive the can bodies one after another, with the ends associated therewith, and join the ends to the can body during the travel of the closing stations, so that the cans are received, closed and ejected during a single rotation of the machine.

In a machine of the above type, the closing stations are necessarily spaced from each other so as to provide room for the parts which cooperate in the securing of the can end to the can body. It is desirable, however, that the seaming stations shall be relatively close together, and shall travel in a relatively small circular path.

An object of the invention is to provide a closing machine wherein the can to be closed is rotated by cooperating rotating chucks, and the can end is secured to the can body by seaming rolls associated with the chucks and bodily traveling therewith, and wherein the actuating mechanism for the seaming rolls travels bodily with the chucks, and the supporting spindles on which the seaming rolls are mounted are located outside of the bodily path of travel of the axes of the chucks, thus permitting the chucks to be placed relatively close to the center about which the seaming stations travel.

Another object of the invention is to provide a machine of the above type wherein the seaming rolls are alternately moved into contact with the flange on the can end for forming the double seam by cams which rotate about a sleeve supporting the upper chuck, and at a different speed than the rotation of the chuck.

A still further object of the invention is to provide a machine of the above type having a supporting base on which a lower frame is mounted, outer supporting columns carried by the lower frame, and an upper frame mounted on said supporting columns, with a rotating turret located within said rotating columns on which the rotating chucks and seaming rolls and the actuating cams for said rolls are mounted.

A still further object of the invention is to provide a machine of the above type with an upper rotating turret carrying the rotating chucks and the seaming rolls, and also a lower rotating turret carrying cooperating rotating chucks for the cans to be closed, which machine is also provided with means whereby said upper turret may be raised and lowered in said frame for operating upon cans of different heights.

A still further object of the invention is to provide a machine of the above type with means whereby the upper rotating turret may be adjusted angularly relative to the lower rotating turret for alining the axes of the cooperating upper and lower chucks.

A still further object of the invention is to provide a machine of the above type with means for raising the lower chuck to clamp the can against the upper chuck, which includes toggle levers movable to a point slightly past dead center when the can is clamped by the chucks, so that the toggles operate to hold the can chucked independent of the actuating mechanism for the toggles.

A still further object of the invention is to provide a machine of the above type with means whereby the toggles may be moved by manually controlled devices at a certain position in the rotation of the turret for the purpose of releasing a can between the first and second operations thereon.

A still further object of the invention is to provide a machine of the above type wherein a center rotating spindle operates to rotate both the upper and lower chucks, so that the timing of the cooperating chucks is maintained.

A still further object of the invention is to provide a machine of the above type wherein the means for rotating the turrets includes a multiple disk clutch, so that in case of a jam, the clutch will slip and prevent the breaking of parts.

These and other objects will in part be obvious and will in part be hereinafter more fully disclosed.

In the drawings which show by way of illustration one embodiment of the invention—

Figure 1 is a plan view of a machine embodying my improvements, with the portion of the machine for receiving the cans to be closed, broken away;

Fig. 1ᵃ is a view partly in section and partly in plan, showing the lower turret of the closing machine, the cover feed turret, and the associated parts for delivering the can and the end to the cover feed turret, and for discharging the closed can from the machine;

Fig. 2 is a sectional view on the line 2—2 of Fig. 1;

Fig. 3 is a sectional view on the line 3—3 of Fig. 2;

Fig. 4 is an enlarged detail, partly in section, showing a face view of portions of the upper frame and the upper part of the upper turret;

Fig. 5 is an enlarged face view of a portion of the upper turret and showing the means for operating the seaming rolls, also showing the can to be closed and the supporting chuck therefor;

Fig. 5ᵃ is a view more or less diagrammatic, showing in plan the operating cams and the mechanism actuated thereby for operating the seaming rolls;

Fig. 6 is a sectional view on the line 6—6 of Fig. 5;

Fig. 7 is a sectional view on the line 7—7 of Fig. 6;

Fig. 8 is a sectional view on the line 8—8 of Fig. 7;

Fig. 9 is a sectional view on the line 9—9 of Fig. 7;

Fig. 10 is a sectional view on the line 10—10 of Fig. 2;

Fig. 11 is a detail showing the parts positioned by the manually operated device for releasing the can from the chucks between the first and second operations on the seam;

Fig. 12 is a sectional view on the line 12—12 of Fig. 11;

Fig. 13 is a sectional view on the line 13—13 of Fig. 10;

Fig. 14 is a view partly in plan and partly in section of the lower turret;

Fig. 15 is a view partly in side elevation and partly in section, showing a portion of the lower turret and showing the actuating cams for raising and lowering the chucks associated with the lower turret;

Fig. 16 is an enlarged vertical sectional view showing a portion of the lower part of the upper turret and showing the lower turret and a portion of the lower supporting frame of the machine;

Fig. 17 is a sectional view on the line 17—17 of Fig. 2;

Fig. 18 is a view showing more or less diagrammatically the manner of feeding the cans into the closing machine and the removing of the cans from the closing machine;

Fig. 19 is a sectional view on the line 19—19 of Fig. 4;

Fig. 20 is a sectional view on the line 20—20 of Fig. 19;

Fig. 21 is a sectional view on the line 21—21 of Fig. 19, and

Fig. 22 is a sectional view on the line 22—22 of Fig. 19.

The invention is directed broadly to a closing machine for cans, and more particularly to a closing machine for closing a filled can. The machine includes a plurality of seaming stations which travel continuously about a fixed center. The can bodies, together with the can ends therefor, are fed to the seaming stations while they are traveling. A supporting base carries the lower frame, on which are mounted three supporting columns, and these columns carry at the upper ends thereof, an upper frame. Supported on the lower frame is a lower turret which rotates on suitable ball bearings on the lower frame. In the center of the machine there is a rotating spindle, and surrounding this rotating spindle, is a sleeve. The sleeve is keyed to the lower turret and is supported by means whereby the sleeve may be raised and lowered. Secured to the upper end of the sleeve is the upper turret, and said upper turret is secured to said sleeve so that the angular position of the upper turret may be adjusted relative to the lower turret. The turrets are rotated by a sleeve shaft mounted in the upper frame. This sleeve shaft is connected to the upper turret so as to rotate the upper turret, and the upper turrent, through the sleeve surrounding the central spindle, rotates the lower turret. The upper turret is connected to the rotating sleeve shaft in such a way that it may be raised and lowered, so that the turrets are properly positioned for the height of can desired to be closed. Mounted on the upper turret is a series of chucks, and these chucks are rotated through a geared connection with the central spindle, and the central spindle is driven from the main shaft. Mounted in the lower turret are a series of chucks, one for each upper chuck, and these upper and lower chucks are in axial alinement, and cooperate to chuck the can during the closing of the same. The lower chucks are raised and lowered by suitable toggle levers which move to a point slightly beyond dead center, so that the toggle lever lever holds the chuck raised. Associated with each pair of cooperating chucks are seaming rolls for performing the first and second seaming operations. These seaming rolls are mounted on levers journaled in the upper turret, and the seaming rolls are so positioned as to travel bodily in a path outside of the axes of the chuck spindles, and well in toward the center of rotation of the turrets. The seaming rolls are moved into contact with the flange on the can end by cams which rotate about the axes of the chuck spindles, and these cams are driven by a stationary gear attached to the upper frame of the machine. By placing the chucks relatively close together, the distance between the cans during closing is comparatively small, and therefore, a can does not need to be accelerated to a great extent when it is fed into the machine from a filling machine in order to properly space the cans for the closing machine. Furthermore, the cans travel in a circular path, the diameter of which is comparatively small, and this aids materially in preventing the spilling of the contents of the cans during closing. The can bodies and can ends are assembled in the assembling turret and are delivered thereby to the closing stations as they pass the take-in point. After the can is closed, which occurs during a partial rotation of the closing machine, a take-away arm removes the closed can from the seaming station.

Referring more in detail to the drawings, my improved can closing machine includes a supporting base 1 on which is mounted the lower frame 2 of the machine. Projecting laterally from this lower frame, are suitable bracket arms 3, three in number. In each bracket arm is a column 4, and on the upper ends of these columns, is supported the upper frame 5 of the machine. Mounted centrally of the columns is a rotating spindle 6. Surrounding this spindle 6 is a sleeve 8 which is rotated independently of the spindle. This sleeve 8 carries the upper turret 9 at its upper portion, and the turret is rigidly, but adjustably secured to the sleeve, and rotates therewith. Surrounding the sleeve is a lower turret 10 which is keyed to the sleeve and rotates therewith, but the sleeve is free to slide up and down in said lower turret for adjusting the machine so as to operate upon cans of different heights. The lower turret is mounted on the lower frame 2. Said lower turret rests on suitable ball bearings 11 carried by said frame. The sleeve 8 is provided with a suitable threaded section 12, and a threaded collar 13 engages the threaded section of the sleeve and supports said sleeve. This threaded collar 13 is located between members 14 and 15 which are in turn secured to short sleeve section 7 which has a telescoping or sliding connection with the lower end of the sleeve 8. The members 14 and 15 and the sleeve section 7 are keyed to the sleeve 8 so as to rotate therewith. The lower member 14 is mounted on ball bearings 14ª, and this serves as a supporting means for the sleeve 8. The threaded collar 13 is provided with a spiral gear which meshes with a worm gear on the shaft 16. By turning the shaft 16, the threaded collar is rotated, and this raises or lowers the sleeve 8 in the sleeve section 7. Thus it is that the upper turret is raised or lowered relative to the lower turret, while the lower turret is mounted so as to rotate on ball bearings on the lower frame of the machine.

Mounted to rotate on the frame 5 is a sleeve shaft 18. This sleeve shaft 18 is mounted in suitable bearings in a depending bracket 19 carried by the upper frame 5. A spiral gear 20 is rigidly secured to the sleeve shaft and this spiral gear 20 meshes with a worm gear 21 carried by a cross shaft 22. A spur gear 23 is freely mounted on this cross shaft, and this spur gear meshes with a similar spur gear 24 mounted on the end of the main driving shaft 25 (see Fig. 2).

As noted above, the spur gear 23 is freely mounted on the shaft 22, but is connected thereto by means of a multiple disk clutch as shown in Figures 19 to 22 of the drawings. This multiple disk clutch includes a member 123 which is keyed to the shaft 22, and a series of clutch disks 124 and 125. The clutch disk 124 and the clutch disk 125 are alternately arranged, and each one of the clutch disks 124 are secured to the hub 23ª of the gear 23. Said hub is provided with longitudinal recesses 23ᵇ, and each of these disks 124 has an inner radial rib 23ᶜ fitting in these longitudinal recesses. Thus it is that these disks 124 are keyed to the hub 23ª. The member 123 is provided with an overhanging flange 126. Each of the disks 125 is provided with recesses 125ª which engage ribs 126ª carried by this overhanging flange 126. Thus it is that the disks 125 are all keyed to the member 123, and this member 123 is keyed to the shaft 22. A spring 127 bears at one end against the member 123 and at its other end against an adjustable collar 128 threaded on to the end of the shaft 22. This spring normally forces the clutch disks into frictional engagement with each other. By adjusting the threaded collar 128, the frictional grip of the clutch disks can be varied.

The main driving shaft 25 is mounted in suitable bearings on the upper frame and is operated by a cone clutch member 26 which is keyed thereto. This clutch member is adapted to be connected to a belt wheel 27 through a clutch operating mechanism which includes a yoke 28, a link 29 attached thereto, and a lever 30 pivoted at 31 to the upper frame member (see Fig. 1). This lever 30 is adapted to be actuated by a hand lever 32 which is pivoted at 33 to the center of the machine. The lever carries an arm 34 which is connected to the lever 30, so that when the lever 32 is oscillated, it will actuate the yoke member 28, and move the friction driving wheel 35 into engagement with the inner friction surface of the belt wheel 27. The rotating movements of the shaft 25 are imparted through the means described, to the sleeve shaft 18. This sleeve shaft 18 carries a series of depending rods 36, which rods extend into suitable recesses formed in the upper turret 9. Thus it is that the sleeve 18 causes the upper turret to rotate. The upper turret causes the sleeve 8 to rotate, and the sleeve 8 causes the lower turret to rotate. When the upper turret is raised to a different set position for operating upon a can of a different height, these rods 36 slide up or down in the recesses with which they are associated, so that the turret can be raised and lowered without disturbing the driving connection therefor.

Mounted in the upper turrent is a series of upper chucks 37, one for each seaming station. Each chuck 37 is mounted on a chuck sleeve 38, and this chuck sleeve is in turn mounted in a suitable bearing located in a space provided therefor in the upper turret. The bearing for the chuck is held in its proper position relative to the turret by a bracket bolted to the side face of the turret. One of these brackets is shown at 44 in Fig. 5, and the bracket is secured to the body of the turret by bolts 45. The chuck is held from endwise movement by a ball thrust bearing 38ª. At the upper end of the chuck sleeve 38 there is a spur gear 39, and the spur gears of the several chuck sleeves mesh with a common central spur gear 40 which is fixed to the central spindle 6. Thus it is that the rotations of the spindle 6 are imparted to the upper chucks.

Cooperating with the upper chucks 37 are lower chucks 92. These lower chucks form the support for the filled can, and the lower chucks are raised so as to clamp the can end and filled can against the upper chuck, and then the two chucks together, rotate the can for causing the seaming rolls to form a double seam. The lower chuck members 92 have to be raised and lowered as well as rotated. These chucks 92 are secured to a sleeve 93 in any suitable way, and the sleeve 93 is in turn keyed to a sleeve gear 94 by means of a key 95. The sleeve gear 94 carries gear teeth 96 at its lower end, and these gear teeth 96 mesh with a pinion 97 which is keyed to the lower end of the center driving spindle 6. It is this driving spindle 6 which rotates the upper chuck spindles, and through this pinion 97, it also rotates these lower chucks or supports for the filled can. Thus it is that both of the upper and lower chucks are positively rotated and are rotated in timing with each other. The pinion 97 is attached to a sleeve 98 which is keyed to the lower end of the spindle 6, and this sleeve 98 is mounted for free rotation in a bushing carried by the sleeve 8.

The sleeve 93 is mounted in a suitable bushing 99 located in a pocket in the lower turret 10. The gear teeth 96 prevent the gear sleeve from moving endwise in one direction in the bushing, and a collar 100 secured to the upper end of the sleeve gear prevents said sleeve gear from moving in the opposite direction in said bushing. Located centrally of the sleeve 93 is a plunger 101. This plunger 101 carries a supporting head 102 at the upper end thereof. The head is threaded on to the plunger and can be adjusted on the plunger. A bolt 103 secures the head to the plunger in adjusted positions. Located between the plunger head and the chuck 92 is a ball cage 104, so that the chuck 92 is supported by the plunger and rotates freely thereon. The sleeve 93, of course, rotates about the plunger with the chuck 92. Secured to the lower end of the plunger 101 are toggle levers consisting of a member 105 which is pivoted to the plunger, and a member 106 which is mounted to oscillate on a supporting shaft 107. The two members are secured together by a pivot bolt 129. The member 106 has a segmental rack 130 which meshes with a rack bar 131. This rack bar 131 is capable of sliding in a direction at right angles to the axis of the shaft 107 in a suitable T-shaped guideway formed in a bracket 132 carried by the lower turret 10. This rack bar 131 carries a roller 133, which runs in a cam groove 134 in a stationary cam 135. This stationary cam is shown in plan view in Fig. 10. Said cam groove has a concentric portion 136 of one radial diameter, and a concentric portion 137 of a less radial diameter, and as the roller passes from one portion of the cam groove to the other, it will move the rack bar 131 radially of the machine, and this will move the toggle members to and from alinement. As the toggle members move into alinement, the lower chuck will be raised, and when they move out of alinement, then the lower chuck will be lowered. These toggle members move slightly by dead center, and their movement is limited by a shoulder 138 on the upper toggle member engaging a shoulder on the lower toggle member. The purpose of having the toggle members move to a point beyond dead center, is to take the strain off from the operating cams for the toggle members. In other words, the cams will move the toggle members so as to raise the lower chuck, and clamp the can against the upper chuck, and when the can is clamped for rotation, the toggles are positioned slightly by dead center, and it is the position of the toggle members which holds the chuck elevated. The stationary cam 135 is secured to the lower frame member 2. This stationary cam has a detachable section 139 which is held in place by a screw 140 and locating pins 141. This is for the purpose to aid in the assembling of the parts. The stationary cam 135 is provided with a cut-away portion 142 in the outer wall thereof, and a recess 143 in the inner wall thereof. Associated with the stationary cam is a hand-operated lever 144. Said lever is pivoted at 145 to said stationary cam, and is provided with a pin 146 which can be moved into the cut-away portion of the cam. The purpose of this hand-operated device is for moving the rack bar to release the lower chuck between the first and second operations of the seaming rolls. It will readily be seen that if the rack bar is stopped opposite the pin 146, when the lever is pulled out at its free end, the pin 146 will engage the roller 133 and will move the roller radially inwardly into the recess 143, and this inward movement of the roller and the rack bar attached thereto, is sufficient to release the toggle levers which support the lower chucks.

A bevel gear 42 is mounted on the upper end of this spindle 6, and this bevel gear 42 meshes with a bevel gear 43 carried by the main driving shaft 25. The main driving shaft, therefore, not only rotates the upper turret, but also rotates all of the chuck spindles, the turret being rotated through the sleeve shaft 18, and the chuck spindles through the spindle 6. Furthermore, it will be noted that the spiral gear 20 is of relatively large diameter, and therefore, the turret will rotate at a much slower speed than the chuck spindles.

The means for supporting and operating the seaming rolls is shown more particularly in Figures 3, 5, 5ª, 6, 7, 8 and 9. The bracket 44 is provided with a bearing sleeve 46 in which is mounted a spindle 47. This spindle carries a first operation roll 48. Also mounted in this bracket is a bearing sleeve 49 for the spindle 50 which carries a second operation roll 51. On the upper end of each spindle there is a bracket member 52. Each bracket member is provided with a cam roll 53. The bracket member 52 carries an adjusting worm gear 54. Each spindle is provided with a rectangular section 55 adjacent the upper end thereof, and mounted on this rectangular section of the spindle is a segment sleeve 56 which has an opening therethrough fitting the rectangular section of the spindle. This segment sleeve 56 has a segment gear 57 with which the adjusting gear 54 meshes. The purpose of this worm gear and segment is to adjust the position of the cam roll relative to the spindle which it operates.

The spindles 47 and 50 are each provided at their lower ends with a crank arm 58. Mounted in this crank arm is a short shaft 59 on which the seaming roll is mounted. It is understood that the second operation roll 51 is mounted on the spindle 50, while the first operation roll 48 is mounted on the spindle 47. The shaft 59 is held in the crank arm of the spindle 50 by a set screw 60. This is true of the first operation roll as well. It is mounted on a shaft carried by the crank arm at the lower end of the spindle 47.

The bracket member 52 is provided with a crank shaft bearing spindle 61. This crank shaft bearing spindle is held from rotation on the bracket member 52 by a pin 62 which passes through an opening in the flange in the bearing spindle, and into an opening in the bracket member 52. Mounted on this bearing spindle 61 is a cam roll 53 for the spindle 50. It is held thereon by a washer 63 and a bolt 64. It can rotate freely on the bearing spindle. There is a similar cam roll 53ª for the spindle 47 carrying the first operation roll 48. It is understood that there is a similar bracket member 52ª and adjusting worm gear 54ª for this spindle 47 which carries the first operation roll 48. The cam roll 53ª is adapted to bear against the cam 65, while the cam roll 53 bears against a cam 66. Springs 67, one for each bracket member, attached to the spindles carrying the seaming rolls, are located between said bracket members and the face of the turret, as shown in Fig. 3. These springs operate to hold the cam rolls in contact with the cams.

These cams 65 and 66 are carried by a sleeve 68, and the sleeve is mounted to rotate freely on a cylindrical bearing on the bracket 69 which is removably secured to the bracket 44 by bolts 69ª. This sleeve 68 which carries the cams 65 and 66 is also provided with a gear 71, and the gear 71 at each seaming station meshes with a spur gear 72 which is fixed to the depending member 19 on the upper frame 5 of the machine.

As the turret rotates, the gears 69 will roll along the toothed surface of the gear 72, and this will rotate the cam sleeve carrying the cams 65 and 66. These cams 65 and 66 will in turn actuate the spindles carrying the seaming rolls. The cam 65 which operates the first seaming roll is provided with a high cam surface 73 and a lower cam surface 74. When the roll is running on the surface 74 of this actuating cam 65, the spring 67 will move the spindle so as to hold the seaming roll out of contact with the can end. There is a gentle lead 76 between the low portion 74 and the high portion 73 of this actuating cam 65. This gentle lead in the actuating cam for the first operation roll will move said first operation roll gradually up against the flange and continue to press the roll against the flange until the first operation is finished in the double seam. The cam 66 for the second operation roll has a high portion 77 and a low portion 78. The low portion is connected with the high portion in the cam 66 by a less gradual lead 76ª, so that the second operation roll is moved somewhat gradually, but fairly quickly into contact with the can end, and is held there until the second operation is finished. It will be apparent from Fig. 5ª of the drawings, that the first operation is performed while the cam is rotating through an arc of about ninety-four degrees, and the second operation is performed while the cam is also rotating through an arc of about ninety-four degrees. There is considerable distance between these high portions of the operating cams 65 and 66, and therefore, there is a considerable period after the first operation is finished, before the second operation begins. One of the reasons for this is to permit the support for the can to be lowered and the can removed from the machine for inspection between the first and second operations thereon, it being understood, of course, that the machine is stopped for this purpose.

The seaming roll is rigidly supported by the seaming spindle. The cam roll is likewise rigidly supported by the spindle, but is adjustable relative thereto. The seaming roll will move, however, to cross a side seam through a torsional twisting or yielding of the spindle shaft which carries the seaming roll. In other words, the spindle carrying the seaming roll is of considerable length, and is capable of yielding or twisting intermediate the ends thereof for the purpose stated. The cam rolls and the seaming rolls are mounted on crank arms in order to obtain the proper swinging movements of the seaming rolls, and in order that the operating spindles for the seaming rolls may be placed relatively close together, and also close to the chuck spindle.

It will be noted from Fig. 5ª that the seaming rolls are mainly in advance of the path of travel of the center of the chuck, which is indicated by the line x, x, and operate upon the can end at points fully outside of the path of travel of the center of the chuck. All of the actuating parts for the seaming rolls are located outside of this path of travel of the center of the chuck. It is by this location of the seaming rolls and the acuating devices therefor, that the chuck spindles may be brought close in toward the center of rotation of the closing machine. It is also by this location of the actuating parts that the chuck spindles may be placed relatively close together. The filled cans when received from the filling machine are closely spaced, but when taken into the closing machine, they must be spaced a sufficient distance to provide room for the actuating mechanism for the seaming rolls. This distance is considerably greater than the spacing of the cans in the filling machine, and therefore, the cans have to be accelerated on their way from the filling machine to the closing machine. This is accomplished in applicant's case by a feed drum 79 which is shown in Figures 1 and 1ª of the drawings. This drum is provided with a spiral thread 80 which is preferably shaped so as to bring about the necessary spacing of the cans as they are delivered to the receiving turret 81. This receiving turret is provided with pockets 82 into which the filled cans are fed, and these pockets of the receiving turret for the filled cans are placed the same distance as the chucks in the closing machine.

By the arrangement above referred to, where the chucks are close together, and move in a relatively small circular path, the spacing of the cans during closing is reduced to a minimum, and therefore, the amount of acceleration necessary to accomplish the proper spacing of the cans as they are delivered to the closing machine is likewise reduced to a minimum.

Associated with each of the upper chuck spindles is a seating pad 83. This seating pad is carried by a spindle 84 which extends up through the sleeve 38 carrying and rotating the chuck. The seating pad is yieldingly raised by a spring 85. It is forced downwardly by a cam 86. This cam 86 surrounds the sleeve bearing 19 in the upper frame, and is keyed thereto so that said cam 86 is stationary. The cam 86 has a high place 87, shown more clearly in Fig. 4 of the drawings. This high place 87 in the cam moves the seating pad spindle downwardly as the turret rotates, and the high point 87 is so positioned in the rotation of the machine as to move the seating pad down and cause the can end to be seated in the can body prior to the raising of the can into contact with the chuck. Thus it is that the can end is held clamped against the upper end of the can body as the can body and end are raised into contact with the upper rotating chuck. The upper turret 9 is provided with upwardly extending brackets 88 which carry a ring 89. This ring 89 is located in a recessed portion formed in the cam 86. There are ball bearings between the ring 89 and the cam 86. The plate 90 secured to the cam 86 overlies this ring. The purpose of this ring is to hold the cam properly positioned for actuating the seating pads. The downward thrust of the cam on the seating pads is caused by the roller bearing for the cam engaging the ring 89 carried by the brackets 88 on the upper turret 9. From the above it will be apparent that this construction permits the turret to rotate freely, and holds the cam against any upward movement as it actuates the seating pads. When the turret is adjusted up or down for can bodies of different heights, then the actuating cam for the seating pads will also be lifted or lowered to correspond with the setting of the turret. There is another high point 91 on this cam 86 which operates to force the seating pads downward at another point in the rotation of the closing machine. The purpose of this high point 91 is to eject or force the can after it is closed, off from the chuck. This occurs at a point in the travel of the seaming station where the can is fully closed and is ready to be ejected from the machine.

Mounted on the rotating sleeve 8 are two members 108 and 109 which are bolted together and thus secured to the sleeve. These members are provided with half molds 110. At the upper face of each half mold there is a can end seat or centering mold 111. These half molds are centered with the axes of the rotating chucks and serve to round up and center the can body relative to the cooperating chucks.

It is very essential that the axes of the upper and lower chucks shall be in alinement, and in order that this may be insured, I have provided means whereby the upper turret may be angularly adjusted on the supporting sleeve 8 therefor. The opening in the turret 9 at the lower end thereof is larger than the sleeve 8, and located in this opening is an elongated collar $8^a$. This collar is keyed to the sleeve 8 so that it rotates with the sleeve 8. The collar $8^a$ at the lower end thereof is provided with a flange $8^b$. The extreme lower end of the upper turret 9 is recessed to receive this flange $8^b$. This flange $8^b$ is provided with recesses $8^c$. Pins $8^d$ mounted in the lower end of the turret project into these recesses $8^c$. The recesses $8^c$ are of considerably greater width than the pins. As shown in the drawings, there are two pins, and two separate recesses therefor, one for each. A threaded bolt $8^e$ is located in the flange and has threaded connection therewith. There are two bolts $8^e$, one for each pin, but these bolts are located on opposite sides of the pin circumferentially of the flange, or substantially so. Each bolt is provided with a head $8^f$ to which a wrench may be applied for turning the bolt in or out. By turning in on one bolt and releasing the other, the turret may be shifted angularly relative to the collar $8^a$, and as the collar $8^a$ is keyed to the sleeve 8, the upper turret is thus angularly adjusted relative to the sleeve 8, and as the sleeve 8 is secured to the lower turret, means is thus provided whereby the upper chucks may be brought into axial alinement with the lower chucks.

The filled cans are received from the closing machine by the feed drum 79 as above referred to. They are fed along the support 112 therefor and are delivered to the pocket 82 of the assembling turret. The can ends are located in a can stack holder 113. The ends are released one at a time from said stack holder and are fed by a shaft 114 having a thread thereon, in a direction at right angles to the travel of the filled can (see Fig. 1). Each half mold in the rotating turret 81 is provided with a can end seat 115. The can end is moved along a supporting rail 116 by a thread 117 on the shaft 114 and is seated in this can end seat. The feed for the can ends is so controlled that no can end is fed unless there is a filled can going into the machine to be closed.

The assembled can bodies and can ends are carried by this turret into the closing machine and the half molds of the turret cooperate with the half molds in the closing machine in the rounding up of the cam body, and the can end seats associated with these half molds center the can end relative to the can body, so that the seating pad can force the can end down onto the can body. Suitable cooperating guides are provided for the guiding of the can body and can end, until the can end is held seated on the can body by the seating pad.

After the can end has been secured to the can body, the seating pad strips the closed can from the upper chuck as above noted. The closed can then comes in contact with the guide rail 118. A take-away arm 119 engages the closed can and forces the same along the guide rail 118 of the machine. This take-away arm is mounted on a rotating shaft 120 which carries a gear 121 meshing with a gear 122 carried by and rotating with the lower turret. There are two take-away arms, first one of which and then the other comes into operation to remove the closed can. The closed can as it is moved by the take-away arm is brought into contact with a spring pressed arm 123 which stops the spinning of the can due to the stored momentum in the can. The can is then moved so as to be engaged by a printing roll 124 where it is suitably marked. This marking mechanism forms no part of the present invention. The marked can passes into a guiding chute 125 and is thus delivered from the machine.

The turret 81 is rotated in timing with the main turret of the closing machine by a gear 126 which is secured to the lower end of a shaft 127 carrying the turret 81 (see Fig. 2). This gear 126 meshes with a gear 128 which is secured to the lower turret and rotates therewith.

It is thought that the operation of the can closing machine will be apparent from the description which has been given, and therefore, the movement of the can body and can end through the machine will only be briefly referred to.

The filled cans are received from the filling machine by the feed drum, and as they are moved along toward the assembling turret, they are spaced from each other. This is brought about through the change in the pitch of the thread on the drum which will accelerate the filled can and bring about a further spacing of the cans. This spacing of the cans is the same as the spacing of the pockets in the receiving turret, and the cans are placed in the receiving turret by the feed drum. The can ends are fed from the can end stack by the feeding mechanism which releases and feeds the can end forward whenever there is a filled can to be closed. The can end is placed on the can end seat of the assembling turret, and this is directly above the filled can. The can end seat on the closing turret centers the can end over the filled can, but the can end rests on the filled can. As the turret rotates, the can end is forced into the can body as the can body is raised against the same. Each sleeve carrying the cams for actuating the seaming rolls is continuously rotating, and is timed so that the low portions of the actuating cams are in contact with the cam rollers when the filled can is first chucked and rotated. This withdraws the seaming rolls so as to permit the filled can and can end to be raised into contact with the upper chuck. As this sleeve carrying the actuating cams continues its rotation, it will move the first operation roll into contact with the can end, and withdraw it from the can end, and then, after a very brief interval, it will move the second operation seaming roll into contact with the can end which will finish the seam. After the seam is completed, the second operation roll is withdrawn from the can end. Both seaming rolls are now out of contact with the can end, and the seating pad moves down so as to strip the closed can from the upper rotating chuck. The rotating take-away arm then engages the closed can and moves it out of the closing machine. The closed can first contacts with the spring actuated arm, which stops the spinning of the can, and then the can is brought into contact with the printing roll and is marked.

It will be noted that from the above construction, the can with its end in place, is clamped between upper and lower rotating chucks, which rotate at the same speed about a common axis, and this positively rotates the chucked can. Where the can body is rotated entirely by an upper chuck, there is liability of the can end being moved on the flange of the can body before the parts are sufficiently clamped against the chuck, so as to rotate the can body, and this disturbs the sealing material. By my improved arrangement, the can body and can end are rotated without any slipping of one on the other. Furthermore, by this positive rotating of the can body, without any slippage on either chuck, during the forming of the seam, a perfect double seam may be formed with a less number of seaming revolutions of the chucks, which, of course, reduces the wear and tear on the machine.

It will also be noted from the above that the can may be readily removed for inspection between the first and second operations, by stopping the machine at the proper point, and through the hand-controlled lever inwardly pressing the roll which operates the toggles so as to permit the lower chuck to be lowered and the can thus released for removal and inspection. The turrets, as above noted, are rotated by a train of mechanism which includes a multiple disk clutch, and therefore, if there is a jam, the clutch will slip, and any breaking of the parts is prevented.

While I have described my can closing machine as particularly adapted for closing filled cans, it will be understood, however, that it may be used for the securing of a can end to a can body in the making up of the can before it is filled. It is also obvious that minor changes in the details of construction and the arrangement of the parts may be made without departing from the spirit of the invention as set forth in the appended claims.

Having thus described the invention, what I claim as new and desire to secure by Letters-Patent, is:—

1. A can closing machine comprising a continuously rotating carrier, a series of cooperating rotating upper and lower chucks mounted on said carrier, seaming mechanism associated with each pair of cooperating chucks, means for raising and lowering the lower chuck for clamping and releasing the can body and can end, said means for raising and lowering the lower chuck including toggle levers adapted to move past dead center when the chuck is raised, whereby said toggle levers hold the chuck raised independent of the actuating means for the toggle levers, and actuating means for positively moving said toggle levers toward and away from dead center.

2. A can closing machine comprising a continuously rotating carrier, a series of cooperating rotating upper and lower chucks mounted on said carrier, seaming mechanism associated with each pair of cooperating chucks, means for raising and lowering the lower chuck for clamping and releasing the can body and can end, said means for raising and lowering the lower chuck including toggle levers adapted to move past dead center when the chuck is raised, whereby said toggle levers hold the chuck raised independent of the actuating means for the toggle levers, and actuating means for positively moving said toggle levers toward and away from dead center, said last-named means including a stationary cam having a cam groove therein for actuating the toggle levers.

3. A can closing machine comprising a continuously rotating carrier, a series of cooperating rotating upper and lower chucks mounted on said carrier, seaming mechanism associated with each pair of cooperating chucks, means for raising and lowering the lower chuck for clamping and releasing the can body and can end, said means for raising and lowering the lower chuck including toggle levers adapted to move past dead center when the chuck is raised, whereby said toggle levers hold the chuck raised independent of the actuating means for the toggle levers, actuating means for positively moving said toggle levers toward and away from dead center, said last-named means including a stationary cam having a cam groove therein for actuating the toggle levers, said stationary cam having a cut-away portion, and a manually controlled lever adapted to move into said cut-away portion when the carrier is stopped, so that the toggle levers may be actuated to release the can between the first and second seaming operations.

4. A can closing machine comprising a continuously rotating carrier, a series of cooperating rotating upper and lower chucks mounted on said carrier, seaming mechanism associated with each pair of cooperating chucks, means for raising and lowering the lower chuck for clamping and releasing the can body and can end, said means for raising and lowering the lower chuck including toggle levers adapted to move past dead center when the chuck is raised, whereby said toggle levers hold the chuck raised independent of the actuating means for the toggle levers, actuating means for positively moving said toggle levers toward and away from dead center, said last-named means including a stationary cam having a cam groove therein for actuating the toggle levers, said stationary cam having a cut-away portion in its outer wall and a recess in its inner wall, and a manually actuated lever adapted to move into said cut-away portion when the carrier is stopped for engaging the toggle actuating device for releasing the toggles to lower the chuck supporting the can, so that the can may be removed between the first and second operations for inspection.

5. A can closing machine comprising a continuously rotating carrier including an upper turret and a lower turret, a series of cooperating chucks mounted on the respective turrets, means for positively rotating the upper chucks, means for raising and lowering the chucks on the lower turret, seaming rolls associated with the chucks on the upper turret, and means for positively shifting the upper turret relative to the lower turret in a direction about the axis of the turrets for aligning the cooperating chucks.

6. A can closing machine comprising a continuously rotating carrier including an upper turret, a sleeve connected to said upper turret, a lower turret connected to said sleeve so as to rotate therewith and permit free endwise movement of the sleeve, means for raising and lowering said sleeve in said lower turret for adjusting the distance between said turrets, a sleeve shaft, and means for connecting said sleeve shaft to said upper turret whereby said upper turret is rotated by the sleeve shaft, but is free to move endwise relative thereto.

7. A can closing machine comprising a continuously rotating carrier including an upper turret, a sleeve connected to said upper turret, a lower turret connected to said sleeve so as to rotate therewith and permit free endwise movement of the sleeve, means for raising and lowering said sleeve in said lower turret for adjusting the distance between said turrets, a sleeve shaft, means for connecting said sleeve shaft to said upper turret whereby said upper turret is rotated by the sleeve shaft, but is free to move endwise relative thereto, and means for angularly adjusting the position of the upper turret on the sleeve relative to the lower turret.

8. A can closing machine comprising a continuously rotating carrier including an upper turret, a sleeve connected to said upper turret, a lower turret connected to said sleeve so as to rotate therewith and permit free endwise movement of the sleeve, means for raising and lowering said sleeve in said lower turret for adjusting the distance between said turrets, a sleeve shaft, means for connecting said sleeve shaft to said upper turret whereby said upper turret is rotated by the sleeve shaft, but is free to move endwise relative thereto, means for angularly adjusting the position of the upper turret on the sleeve relative to the lower turret, a collar keyed to the shaft and located within said upper turret, said collar having a flange provided with recesses, pins carried by said upper turret and extending into said recess, and an adjusting screw associated with each pin for shifting the angular position of the upper turret relative to the sleeve on which it is mounted.

9. A can closing machine comprising a supporting base, a lower frame mounted thereon, spaced columns attached to said lower frame, an upper frame mounted on said columns, a rotating carrier located within said columns including an upper turret and a lower turret, said lower turret being mounted on the lower frame so as to rotate freely thereon, a supporting sleeve keyed to said lower turret and capable of endwise movement therein, means for raising and lowering the sleeve, rotatable with the sleeve, means for supporting said sleeve whereby it may rotate on said lower frame, said upper turret being mounted on said sleeve so that when said sleeve is raised or lowered, the position of the upper turret relative to the lower turret is adjusted, a series of chucks carried by said upper turret, seaming rolls associated with each chuck, a spindle located within said sleeve, said spindle having a geared connection with the chucks for rotating the same, and means for rotating said carrier.

10. A can closing machine comprising a supporting base, a lower frame mounted thereon, spaced columns attached to said lower frame, an upper frame mounted on said columns, a rotating carrier located within said columns including an upper turret and a lower turret, said lower turret being mounted on the lower frame so as to rotate freely thereon, a supporting sleeve keyed to said lower turret and capable of endwise movement therein, means for raising and lowering the sleeve, rotatable with the sleeve, means for supporting said sleeve whereby it may rotate on said lower frame, said upper turret being mounted on said sleeve so that when said sleeve is raised or lowered, the position of the upper turret relative to the lower turret is adjusted, a series of chucks carried by said upper turret, seaming rolls associated with each chuck, a spindle located within said sleeve, said spindle having a geared connection with the chucks for rotating the same, means for rotating said carrier, a main shaft, said means for rotating the carrier through said main shaft including a multiple disk clutch, and independent means operated by said main shaft for rotating said spindle.

11. A can closing machine comprising a supporting base, a lower frame mounted thereon, spaced columns attached to said lower frame, an upper frame mounted on said columns, a rotating carrier located within said columns including an upper turret and a lower turret, said lower turret being mounted on the lower frame so as to rotate freely thereon, a supporting sleeve keyed to said lower turret and capable of endwise movement therein, means for raising and lowering the sleeve, rotatable with the sleeve, means for supporting said sleeve whereby it may rotate on said lower frame, said upper turret being mounted on said sleeve so that when said sleeve is raised or lowered, the position of the upper turret relative to the lower turret is adjusted, a series of chucks carried by said upper turret, seaming rolls associated with each chuck, a spindle located within said sleeve, said spindle having a geared connection with the chucks for rotating the same, means for rotating said carrier, a sleeve shaft mounted in said upper frame, and rods carried by said sleeve shaft and having a sliding connection with the upper turret.

12. A can closing machine comprising a supporting base, a lower frame, spaced columns carried by said lower frame, an upper frame mounted on said columns, a rotating carrier located within said columns including an upper and a lower turret, a series of cooperating rotating chucks mounted on said upper and lower turrets, respectively, seaming rolls associated with each pair of cooperating chucks, actuating cams associated with each pair of cooperating chucks for moving said seaming rolls about centers fixed relative to the axis of the chuck and toward and from said axis, a stationary gear carried by the upper frame and connected to said cams for rotating the same as the carrier rotates, a central spindle extending through said turrets, and means for connecting said central spindle to the upper and lower chucks for positively rotating the same.

13. A can closing machine comprising a supporting base, a lower frame, spaced columns carried by said lower frame, an upper frame mounted on said columns, a rotating carrier located within said columns including an upper and a lower turret, a series of cooperating rotating chucks mounted on said upper and lower turrets, respectively, seaming rolls associated with each pair of cooperating chucks, actuating cams associated with each pair of cooperating chucks for moving said seaming rolls about centers fixed relative to the axis of the chuck and toward and from said axis, a stationary gear carried by the upper frame and connected to said cams for rotating the same as the carrier rotates, a central spindle extending through said turrets, means for connecting said central spindle to the upper and lower chucks for positively rotating the same, and means for moving the chucks toward and from each other in each cooperating pair for clamping and releasing the can to be closed.

14. A can closing machine comprising a supporting base, a lower frame, spaced columns carried by said lower frame, an upper frame mounted on said columns, a rotating carrier located within said columns including an upper and a lower turret, a series of cooperating rotating chucks mounted on said upper and lower turrets, respectively, seaming rolls associated with each pair of cooperating chucks, actuating cams associated with each pair of cooperating chucks for operating the seaming rolls, a stationary gear carried by the upper frame and connected to said cams for rotating the same as the carrier rotates, a central spindle extending through said turrets, means for connecting said central spindle to the upper and lower chucks for positively rotating the same, means for moving the chucks toward and from each other in each cooperating pair for clamping and releasing the can to be closed, a pad, a spindle carrying said pad and located centrally of the upper chuck, a stationary cam adapted to engage the spindle carrying the pads, said cams operating to move a pad into engagement with an end for seating the same in the can prior to the chucking of the can, and for stripping the closed can from the chuck.

15. A can closing machine comprising a supporting base, a lower frame mounted in said base, a series of spaced columns carried by said lower frame, an upper frame attached to said columns, a rotating carrier located within the columns and including upper and lower turrets, a series of chucks mounted on said upper turret, a series of cooperating chucks mounted on said lower turret, in alinement with the upper chucks, means connecting the turrets including devices whereby the angular position of the turrets may be adjusted to aline the chucks, a main driving shaft, a connection between said main driving shaft and the chucks for positively rotating the same, and a connection between the main driving shaft and the carrier for rotating the carrier including a multiple disk clutch.

16. A can closing machine comprising a supporting base, a lower frame mounted in said base, a series of spaced columns carried by said lower frame, an upper frame attached to said columns, a rotating carrier located within the columns and including upper and lower turrets, a series of chucks mounted on said upper turret, a series of cooperating chucks mounted on said lower turret, in alinement with the upper chucks, means connecting the turrets including devices whereby the angular position of the turrets may be adjusted to aline the chucks, a main driving shaft, a connection between said main driving shaft and the chucks for positively rotating the same, a connection between the main driving shaft and the carrier for rotating the carrier including a multiple disk clutch, and means whereby said upper turret may be adjusted relative to the lower turret for operating upon cans of different heights.

17. A can closing machine comprising a continuously rotating carrier, a series of rotating upper chucks mounted on said carrier, a seaming mechanism associated with each chuck including first and second operation seaming rolls, a supporting spindle for each seaming roll, said spindles being parallel with the axis of the chuck and having an arm on which the seaming roll is mounted, each spindle having a second arm at the upper end thereof, a cam roll mounted on said last-named arm, a cam sleeve mounted to rotate about the axis of each chuck, means for rotating said cam sleeve independent of the rotation of the chuck, and cams carried by said sleeve for engaging the cam rolls for actuating the seaming rolls.

18. A can closing machine comprising a continuously rotating carrier, a series of rotating upper chucks mounted on said carrier, a seaming mechanism associated with each chuck including first and second operation seaming rolls, a supporting spindle for each seaming roll, said spindles being parallel with the axis of the chuck and having an arm on which the seaming roll is mounted, each spindle having a second arm at the upper end thereof, a cam roll mounted on said last-named arm, a cam sleeve mounted to rotate about the axis of each chuck, means for rotating said cam sleeve independent of the rotation of the chuck, and cams carried by said sleeve for engaging the cam rolls for actuating the seaming rolls, said supporting spindles for the seaming rolls being of sufficient length so as to yield to permit the seaming rolls to pass the side seam in the can body.

19. A can closing machine comprising a continuously rotating carrier, a series of rotating upper chucks mounted on said carrier, a seaming mechanism associated with each chuck including first and second operation seaming rolls, a supporting spindle for each seaming roll, said spindles being parallel with the axis of the chuck and having an arm on which the seaming roll is mounted, each spindle having a second arm at the upper end thereof, a cam roll mounted on said last-named arm, a cam sleeve mounted to rotate about the axis of each chuck, means for rotating said cam sleeve independent of the rotation of the chuck, and cams carried by said sleeve for engaging the cam rolls for actuating the seaming rolls, said spindle at the upper ends therof also having projecting arms with which springs cooperate for holding the cam rolls in engagement with the cams.

20. A can closing machine comprising a continuously rotating carrier, a series of rotating upper chucks mounted on said carrier, a seaming mechanism associated with each chuck including first and second operation seaming rolls, a supporting spindle for each seaming roll, said spindles being parallel with the axis of the chuck and having an arm on which the seaming roll is mounted, each spindle having a second arm at the upper end thereof, a cam roll mounted on said last-named arm, a cam sleeve mounted to rotate about the axis of each chuck, means for rotating said cam sleeve independent of the rotation of the chuck, and cams carried by said sleeve for engaging the cam rolls for actuating the seaming rolls, said spindles at the upper ends thereof also having projecting arms with which springs cooperate for holding the cam rolls in engagement with the cams, said projecting arms for the spring and for the cam rolls being connected to the spindle by a segment gear and a manually operated work shaft, whereby the position of the arm carrying the cam roll can be adjusted relative to the spindle.

21. A can closing machine comprising a continuously rotating carrier, a series of rotating upper chucks mounted on said carrier, a can supporting chuck located beneath each upper chuck, means for raising the can supporting chuck to bring the can with the assembled can end thereon into engagement with the upper rotating chuck, a seaming mechanism associated with each rotating chuck, said seaming mechanism including a first and a second operation roll, a spindle for each seaming roll, a projecting arm at the lower end of said spindle on which said seaming roll is mounted, a projecting arm at the upper end of said spindle on which the cam roll is mounted, a sleeve mounted to rotate about the axis of the chuck, first and second operation cams mounted on said sleeve and adapted to actuate said seaming rolls, said spindles, seaming rolls and cam rolls all being located outside of the bodily path of travel of the center of the chuck, whereby said chuck may be located so that the circular path of travel thereof is relatively small.

22. A can closing machine comprising a rotating carrier, a series of rotating chucks mounted on said carrier, first and second operation rolls associated with said chucks, a supporting spindle for each seaming roll mounted in fixed position relative to the chuck, said spindle having a crank at the lower end thereof on which the seaming roll is mounted, said spindle having a bracket member at the upper end thereof, a crank shaft bearing spindle mounted on said bracket for the cam actuated roll, and means for preventing said crank shaft bearing spindle from turning in said bracket.

23. A can closing machine comprising a rotating carrier, a series of rotating chucks mounted on said carrier, first and second operation rolls associated with said chucks, a supporting spindle for each seaming roll mounted in fixed position relative to the chuck, said spindle having a crank at the lower end thereof on which the seaming roll is mounted, said spindle having a bracket member at the upper end thereof, a crank shaft bearing spindle mounted on said bracket for the cam actuated roll, means for preventing said crank shaft bearing spindle from turning in said bracket, said bracket being adjustably mounted on said spindle, whereby the angular position of the cam roller relative to the seaming roll can be varied.

24. A can closing machine comprising a rotating carrier, a series of rotating chucks mounted on said carrier, first and second operation rolls associated with said chucks, a supporting spindle for each seaming roll, said spindle having a crank at the lower end thereof on which the seaming roll is mounted, said spindle having a bracket member at the upper end thereof, a crank shaft bearing spindle mounted on said bracket for the cam actuated roll, means for preventing said crank shaft bearing spindle from turning in said bracket, said bracket being turnably mounted on said spindle, a sleeve having a segment gear fixed to said spindle, a worm shaft carried by the bracket and meshing with said segment gear for adjusting the angular position of the cam roll relative to the seaming roll.

25. A can closing machine including in combination, a continuously rotating carrier including an upper and a lower turret, a series of cooperating chucks mounted respectively on the turrets, means for positively rotating said chucks, seaming rolls associated with each pair of cooperating chucks, a support for each chuck on the lower turret on which said chuck is freely rotatable, and means for raising and lowering said supports, each including toggle links pivotally connected to the support and to the lower turret, one of said toggle links having segmental teeth thereon, a rack bar engaging said segmental teeth and movable radially of the lower turret, a stationary cam having a cam groove in the upper face thereof, and a roller carried by the rack bar and engaging said cam groove, said cam groove being shaped so as to move said toggles into alinement for raising the chucks and away from alinement for lowering the chucks.

26. A can closing machine including in combination, a continuously rotating carrier including an upper and a lower turret, a series of cooperating chucks mounted respectively on the turrets, means for positively rotating said chucks, seaming rolls associated with each pair of cooperating chucks, a support for each chuck on the lower turret on which said chuck is freely rotatable, means for raising and lowering said supports, each including toggle links pivotally connected to the support and to the lower turret, one of said toggle links having segmental teeth thereon, a rack bar engaging said segmental teeth and movable radially of the lower turret, a stationary cam having a cam groove in the upper face thereof, a roller carried by the rack bar and engaging said cam groove, said cam groove being shaped so as to move said toggles into alinement for raising the chucks and away from alinement for lowering the chucks, said stationary cam being cut away at one point therein, a manually operated lever, a pin carried thereby adapted to move into said cutaway portion in the cam, whereby said lower turret may be stepped with the rack bar opposite said pin, so that said lever may be manipulated for operating the rack bar to lower the chuck.

27. A can closing machine comprising a continuously rotating carrier, a series of rotating upper chucks mounted on said carrier and bodily traveling therewith, seaming rolls associated with each chuck, devices for supporting and moving said seaming rolls about centers fixed relative to the axis of the chuck toward and from said axis, rotating cams for operating said devices, said actuating devices and seaming rolls being located outside of the path of bodily travel of the center of the chucks, said cams being mounted on a sleeve rotating about the axis of the rotating chuck with which it is associated, a spur gear secured to said sleeve, and a stationary spur gear engaging the spur gears of all of the actuating cams for the seaming devices whereby the actuating cams are caused to rotate by the rotation of the carrier.

28. A can closing machine comprising a continuously rotating carrier including an upper and a lower turret, means for rotating said turrets, a series of rotating chucks mounted on the upper turret, means for positively rotating said chucks, seaming rolls associated with each chuck, actuating cams for the seaming rolls mounted on said upper turret and for rotation about the axis of the chuck with which they are associated, means for rotating said cams, and means whereby the upper turret with the chucks, the seaming levers and the cams for actuating the same may be raised or lowered for operation upon cans of different heights.

29. A can closing machine comprising a continuously rotating carrier including an upper and a lower turret, means for rotating said turrets, a series of rotating chucks mounted on the upper turret, means for positively rotating said chucks, seaming rolls associated with each chuck, actuating cams for the seaming rolls mounted on said upper turret and for rotation about the axis of the chuck with which they are associated, means for rotating said cams, means whereby the upper turret with the chucks, the seaming levers and the cams for actuating the same may be raised or lowered for operation upon cans of different heights, a can support associated with each chuck and mounted on said lower turret, and means for raising and lowering the same.

30. A can closing machine comprising a continuously rotating carrier, a series of rotating upper chucks mounted on said carrier and bodily traveling therewith, seaming rolls associated with each chuck, devices mounted on pivotal supports fixed to the carrier for supporting said seaming rolls whereby they may be moved toward and from the axis of the chuck with which the seaming rolls are associated, and rotating cams for operating said devices, said actuating devices and seaming rolls being located outside of the path of bodily travel of the center of the chucks.

In testimony whereof, I affix my signature.

ALFRED L. KRONQUEST.